United States Patent [19]

Powell

[11] Patent Number: 5,066,408
[45] Date of Patent: Nov. 19, 1991

[54] MEANS AND METHOD TO TREAT SWIMMING POOL WATER

[76] Inventor: Jonathan S. Powell, 5094 Tip Top Rd., Mariposa, Calif. 95338

[21] Appl. No.: 493,801

[22] Filed: Mar. 15, 1990

[51] Int. Cl.[5] .............................................. C02F 1/66
[52] U.S. Cl. .................................... 210/765; 210/169; 210/192
[58] Field of Search .............. 210/696, 749, 752, 754, 210/764, 765, 169, 192; 544/192; 514/960; 424/715

[56] References Cited

U.S. PATENT DOCUMENTS

| | | | |
|---|---|---|---|
| 2,980,622 | 4/1961 | Symes | 252/99 |
| 4,031,090 | 6/1977 | Goldstein et al. | 544/190 |
| 4,087,360 | 5/1978 | Faust et al. | 210/756 |
| 4,389,318 | 6/1983 | Wojtowicz | 210/755 |
| 4,423,216 | 12/1983 | Wojtowicz et al. | 544/192 |

FOREIGN PATENT DOCUMENTS 1475018 6/1977 United Kingdom .............. 210/765

Primary Examiner—Peter Hruskoci
Assistant Examiner—Krisanne Shideler
Attorney, Agent, or Firm—Duane C. Bowen

[57] ABSTRACT

A swimming pool is treated by a mixture of sodium carbonate and cyanuric acid or sodium carbonate alone added in the form of a compacted tablet. The tablet is placed in a leaf skimmer or in a bypass cartridge connected to a swimming pool recirculation pump parallel to a pool filter. The tablet is formed by depositing a mixture of sodium carbonate and water in a vessel and by applying pressure to the mixture.

13 Claims, 4 Drawing Sheets

MEANS AND METHOD TO TREAT SWIMMING POOL WATER

BRIEF SUMMARY OF THE INVENTION, BACKGROUND AND OBJECTIVES

Sodium carbonate and cyanuric acid materials are added to the water of a swimming pool by compacting the materials into a tablet and placing the tablet in a swimming pool leaf skimmer.

When swimming pool water becomes too acid because of chlorination, the water has to be alkalyzed, usually with sodium carbonate powder. To stabilize chlorine in swimming pool water, cyanuric acid is added to the water in a concentration of about 100 ppm.

Extreme care needs to be taken in adding and distributing sodium carbonate powder to try to avoid exceeding the solubility of sodium carbonate in the water. If it is exceeded, a cloudy precipitate of calcium carbonate forms in the pool water. Calcium ions become concentrated in swimming pool water due to presence of calcium ions in original water and in makeup water added to compensate for pool evaporation. Calcium also can come from pool plaster. Calcium carbonate precipitate is undesirable because the precipitate does not go back into solution and the pool water remains cloudy.

Cyanuric acid is difficult to dissolve because it is only very slightly soluble. It is a weak acid and causes staining of pool plaster surfaces if undissolved. If carried undissolved into the piping system of the pool, pipes and other metal materials can be corroded.

Objectives of my invention include: to add sodium carbonate to swimming pool water in a manner preventing precipitation of calcium carbonate; to convert cyanuric acid into its mono sodium salt, which is not acid and is more soluble than cyanuric acid, before it is introduced into pool water; to add sodium carbonate or a combination of sodium carbonate and cyanuric acid to pool water; and to add these materials in the form of compacted tablets which are placed in swimming pool leaf skimmers, so that recirculating water slowly dissolves the materials in the tablets and introduces the materials gradually into the pool water.

My invention will be best understood, together with additional advantages and objectives thereof, when read with reference to the drawings.

INTRODUCTION

Figure 1:
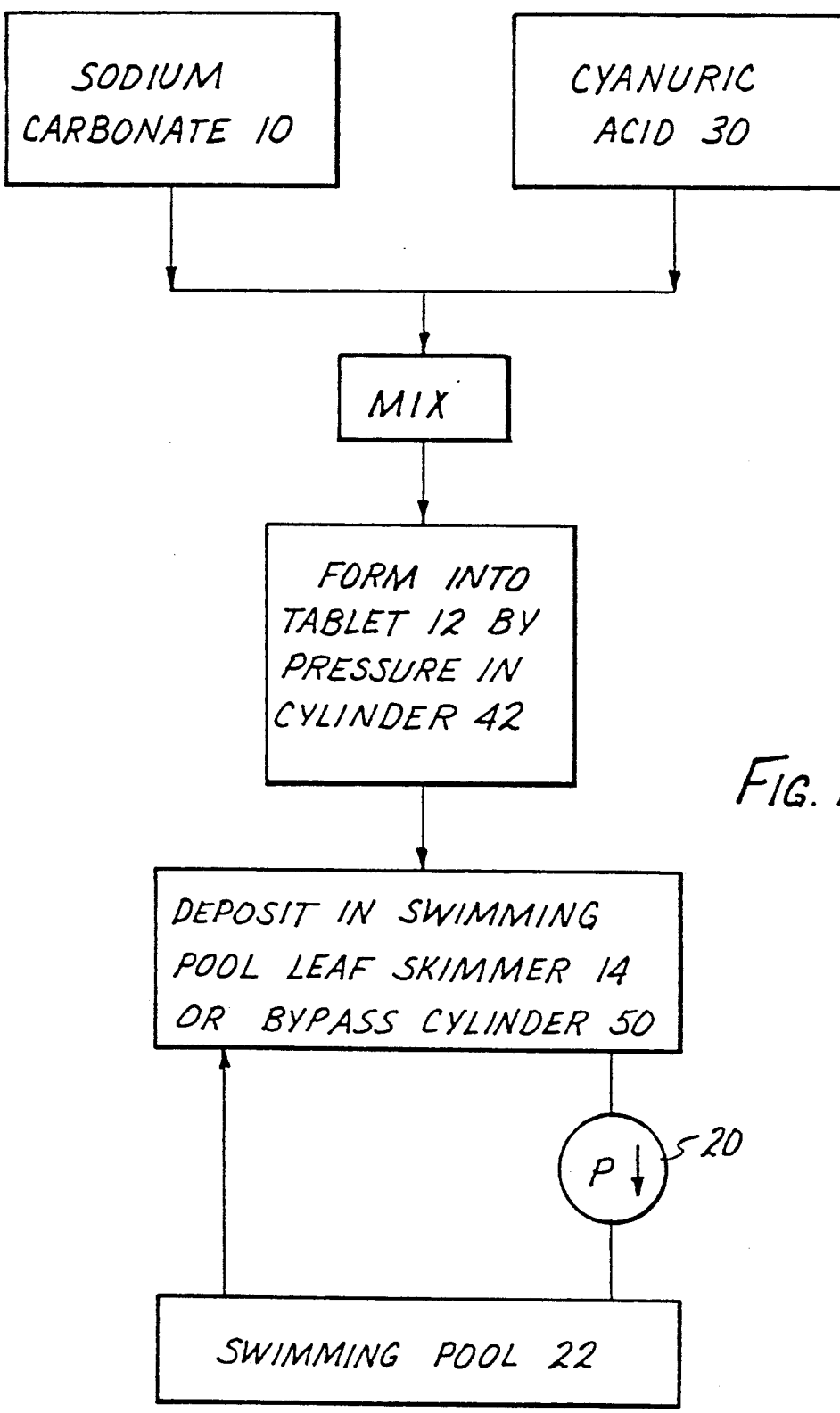
FIG. 1 is a flow diagram illustrating a specific embodiment of my system for adding cyanuric acid and sodium carbonate to swimming pool water.
Figure 2:
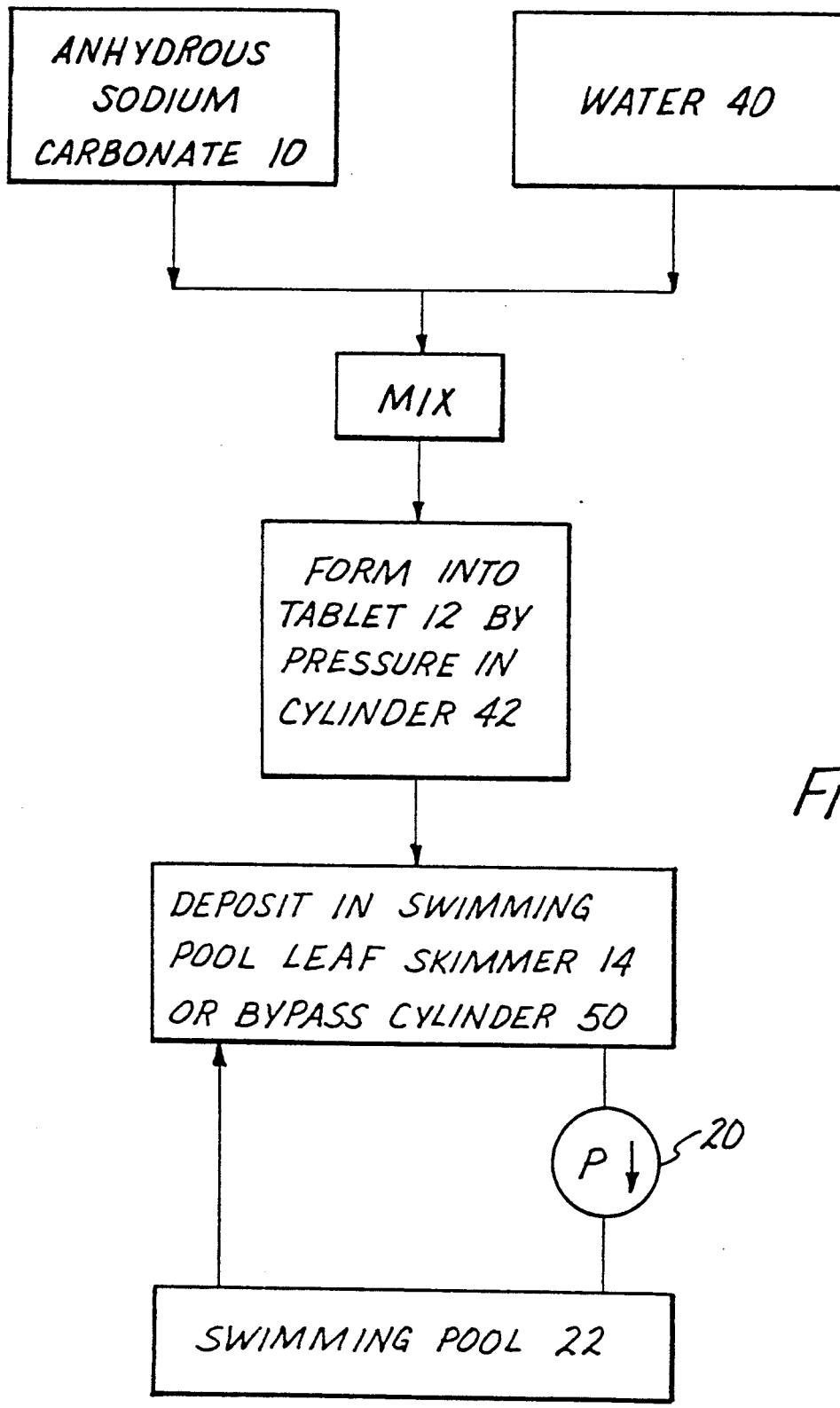
FIG. 2 is like FIG. 1 except the system only adds sodium carbonate to the water.

When chlorine gas is used to treat swimming pools for bacteria and algea control, hydrochloric acid is produced which can lower the water pH below the desired pH range of 7.2 to 7.8. It is necessary to add an alkalyzer periodically such as anhydrous sodium carbonate (soda ash) to prevent the pH from dropping below 7.2. Granular soda ash is conventionally added to the pool water to raise the pH. Care must be exercized to widely scatter the soda ash over the pool water surface so that a high concentration of soda ash does not occur in one location. If it does calcium ions which are present in all pool waters will react with the carbonate ions of the soda ash to form a cloud of insoluble calcium carbonate. This cloud of calcium carbonate does not redissolve and it is very difficult to remove it from the water.

In sunlight chlorine in water is rapidly hydrolyzed to hypochlorous acid, and the hypochlorous acid decomposes into hydrochloric acid and oxygen. Therefore the chlorine does not remain (as hypochlorite ions) long enough to be effective in sanitizing the pool water. So much chlorine has to be added to maintain a residual of at least 0.5 ppm, that consumption of chlorine is high.

If cyanuric acid is added to the pool water to bring the concentration of the isocyanurate ion to 50 to 100 ppm, the chlorine will react with the isocyanurate ion to form a chlorinated compound which releases the chlorine as required to sanitize the pool water. The chlorine stored in this compound is shielded from ultra violet light degradation. This extends the effective life of the chlorine in the pool water many times over what it is without the isocyanurate ion being in the pool water.

Cyanuric acid is a weak acid, and it is only soluble in water to the extent of 0.15% at 25 deg. C. and a saturated water solution has a pH of 3. A 20,000 gal. pool requires that 17 lbs. of cyanuric acid be dissolved in the water to bring the desired concentration of cyanuric acid to 100 ppm. Because of the low solubility of cyanuric acid and slow rate of solution, it is difficult and time consuming for a service man to dissolve this much cyanuric acid powder in a pool. Because it is an acid, it will stain and etch the pool plaster surface before it is all put into solution. If it is put into the skimmer with the water circulating, it can plug the return line or produce a corrosive environment with chlorine in the water in the pool's plumbing system. It also can make the pH of the pool water too low requiring the addition of an alkalyzer.

If the cyanuric acid is first converted to mono sodium isocyanurate (MSI) by reacting it with soda ash, the MSI will dissolve more rapidly and without causing damage to the pool system or without substantially lowering the pool water pH. MSI has a solubility of 0.7% at 20 deg. C. or five times that of cyanuric acid.

After a pool water is initially treated to bring the isocyanurate ion concentration to 100 ppm, cyanuric acid needs to be periodically added to the pool water to maintain this concentration. Experience has shown that for a 20,000 gal. pool the loss of isocyanurate is equivalent to the loss of about one lb. of cyanuric acid per month or about 12 lbs. of cyanuric acid needs to be added to the pool water per year for proper maintenance of the isocyanurate ion concentration.

I have invented a means of adding soda ash and cyanuric acid to pool water which can be conveniently and rapidly done by a service person without causing the formation of a calcium carbonate cloud or the deleterious condition caused by adding raw cyanuric acid to the pool water.

This is accomplished by making compressed tablets of mixtures of soda ash and cyanuric acid ranging from pure soda ash to 41% soda ash (41% soda ash and 59% cyanuric acid, the chemical equivalent ratio to form MSI). When these tablets are placed in the pool water, preferably in the skimmer, the tablets absorb water, and the soda ash and cyanuric acid chemically react to form MSI. The MSI and excess soda ash slowly dissolve to add soda ash to alkalyze the pool water and cyanuric acid as MSI to initially charge or maintain the pool water with the desired concentration of MSI.

The 100% soda ash tablets are used when only alkalyzing the pool water is required, and the 59% cyanuric acid tablets are used to initially bring the pool water to 100 ppm with isocyanurate ion. For both alkalyzing the pool and maintenance of the isocyanurate ion concentration tablets range from no cyanuric acid to 59%. For example, tablets with 10, 20, 30, 40, 50, or 59 percent cyanuric acid which would respectively contain 90, 80, 70, 60, 50, or 41 percent soda ash could be used.

The rate of solution of a tablet in a pool skimmer decreases as the cyanuric acid content increases. This is shown in the attached graph in which tablets of the same size (110-130 grams) but with varying ratios of ingredients are compared. A tablet of 100% soda ash dissolved in 30 minutes, one with 59% cyanuric acid (41% soda ash) dissolved in 480 minutes, one with 20% cyanuric acid dissolved in 100 minutes, one with 40% cyanuric acid dissolved in 280 minutes, and one with 50% cyanuric acid dissolved in 360 minutes.

The time it takes for a tablet to dissolve is directly proportional to its weight and inversely proportional to its surface area. To decrease the time of adding MSI to a pool, many small tablets of a total weight will dissolve more rapidly than the same weight of large tablets. This also applies to tablets of 100% soda ash.

Since it is desired to add soda ash to the pool water slowly, large tablets of pure soda ash are used. Smaller tablets can be used if cyanuric acid is present, because as mentioned above, the rate of solution is decreased if it contains cyanuric acid.

In one example, a one pound tablet of soda ash dissolved in 1¾ hours in a pool skimmer with the water circulating without the formation of any calcium carbonate precipitate. A field test was made using one pound tablets of soda ash in treating some pools which were prone to the formation of a cloud of calcium carbonate when using granular soda ash. Cloud formation did not occur when using the soda ash tablets.

In another example, tablets were used of about ¼ lb. made from a mixture of 41% soda ash and 59% cyanuric acid and there was no evidence of the formation of a cloud of calcium carbonate.

In addition to chlorinating swimming pool water with chlorine gas the following compounds have been used commercially by various parties:
1. Sodium hypochlorite solution.
2. Calcium hypochlorite.
3. Sodium dichloroisocyanurate.
4. Trichloroisocyanuric acid.

Sodium hypochlorite and calcium hypochlorite raise the pH of pool water. Sodium dichloroisocyanurate is essentially neutral and does not change the pH. Trichloroisocyanuric acid lowers the pH.

In starting a pool up using any of these compounds it is first necessary to boost the isocyanurate concentration by adding cyanuric acid to the pool water. With the first two this boost should be to 100 ppm. With the latter two since they both add active chlorine and isocyanurate ion, the initial boost can be somewhat less, and additional cyanuric acid need not be added for maintenance of the isocyanurate ion concentration.

In using any of these compounds boosting the isocyanurate ion concentration with tablets of the mixture of 41% soda ash and 59% cyanuric acid would be a better and more convenient way of adding cyanuric acid to the pool water. With the first two compounds, continued use of such tablets would be desirable for maintenance of the proper isocyanurate ion concentration.

Maintenance of the isocyanurate ion concentration would not require the use of these tablets for the latter two compounds since their use also adds isocyanurate ions. Even the use of soda ash tablets would not be needed with the trichloroisocyanuric acid since the amount of acid it would contribute would be off set by the natural alkalinity of the makeup water added to the pool.

SPECIFIC DESCRIPTION

If a swimming pool water becomes too acid because of chlorination with chlorine gas which produces hydrochloric acid or any other treating chemicals which produce acid, the water has to be alkalyzed by adding an alkalyzer such as sodium carbonate powder.

If extreme care is not taken to add the sodium carbonate slowly and distribute it well, the localized high concentration of carbonate ions can exceed the solubility of calcium carbonate and a cloudy precipitate of calcium carbonate forms in the pool water. This is a very undesirable condition because the precipitate does not go back into solution and the pool water remains cloudy.

Calcium ions in pool water increase with time because of the addition of makeup water (to allow for evaporation) naturally containing calcium ions and from calcium released from the pool plaster. To stabilize chlorine in swimming pool water, cyanuric acid is added to the pool water to bring its concentration to about 100 ppm. Cyanuric acid is difficult to dissolve because it is only very slightly soluble and it is a weak acid. Undissolved cyanuric acid causes staining of pool plaster surfaces. If cyanuric acid is carried undissolved into the piping system of a pool, it can cause corrosion of metal materials especially in the presence of chlorine.

My objectives include:
1. To add sodium carbonate in a manner to prevent the precipitation of calcium carbonate, and
2. To convert the cyanuric acid into its mono sodium salt, which is not acid and is more soluble than cyanuric acid, before it is introduced into the main body of water in a swimming pool.

Sodium carbonate 10 is added as a large tablet 12 of compressed sodium carbonate placed in a swimming pool leaf skimmer 14. Water passing over tablet 12 in skimmer 14 slowly dissolves the sodium carbonate, and water from skimmer 14 is discharged by a circulating pump 20 back into the pool 22 causing a slow and good distribution of the sodium carbonate. No precipitation of calcium carbonate results from this manner of adding the sodium carbonate.

Cyanuric acid 30 can be mixed with the sodium carbonate 10 before it is compressed into a tablet 12' up to a maximum of 41% sodium carbonate and 59% cyanuric acid, the equivalent amounts of these two chemicals to react and form the mono sodium salt of cyanuric acid. As tablet 12' dissolves the carbonate 10 and the cyanuric acid 30 react, and the mono sodium salt formed dissolves in the circulating pool water. If more sodium carbonate is in the tablet 12' than is required for the reaction, both sodium carbonate and the mono sodium salt will be released.

The presence of cyanuric acid in the tablet slows up its rate of solution. The attached graph, FIG. 3, shows the relationship for the time for the tablet to dissolve and the percentage of cyanuric acid in the tablet.

Figure 3:
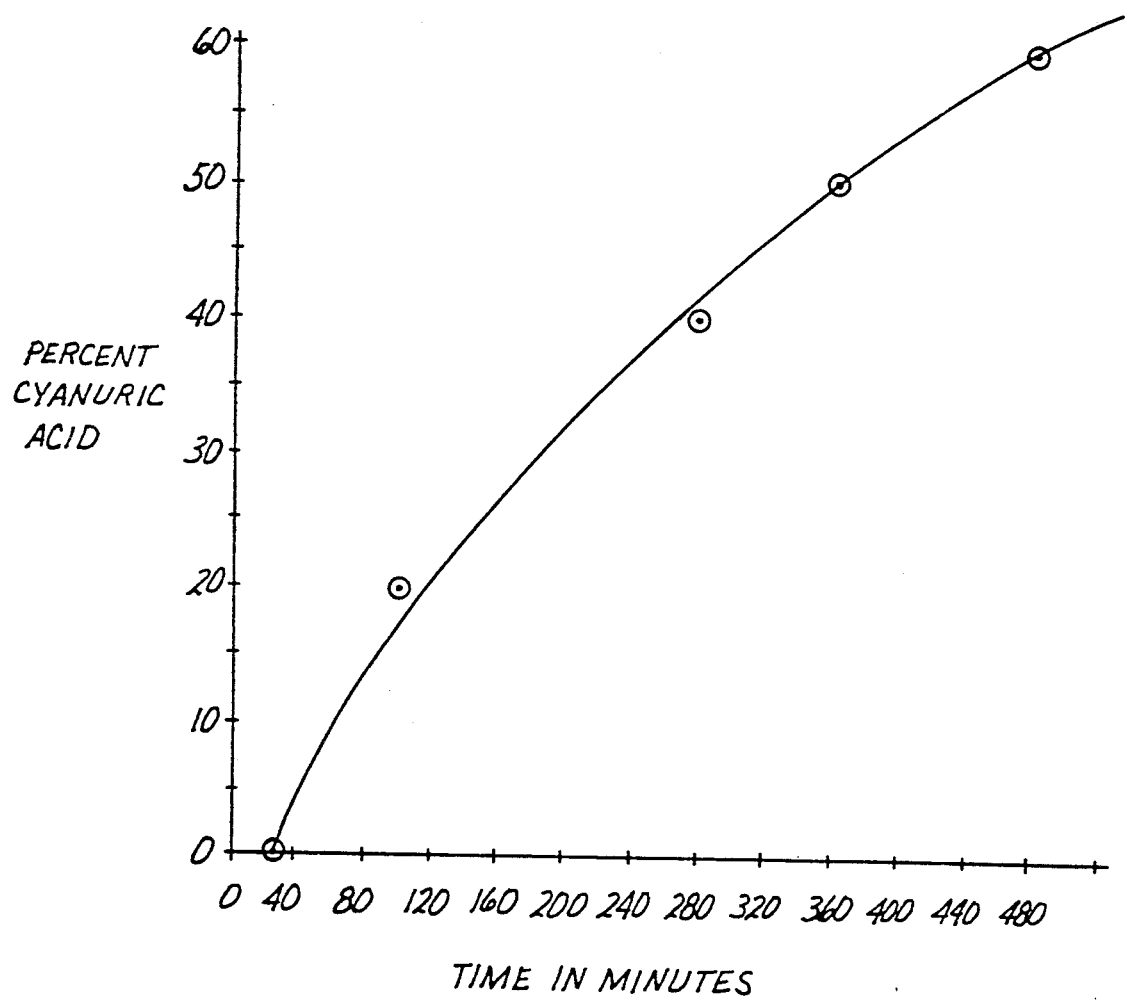
FIG. 3 is a graph relating time to dissolve a tablet to the proportion of sodium carbonate and cyanuric acid in the tablet.

The graph of FIG. 3 indicates the time taken to dissolve tablets of a mixture of cyanuric acid and sodium carbonate in a swimming pool skimmer at continuous flow, 85° F. pool water. The tablet weight was 110-130 grams. The tablet length was 2½ inches. The tablet diameter was 1½ to 1⅝ inches. Various percentages of cyanuric acid in tablets are represented.

The cyanuric acid in a tablet containing the equivalent amount of sodium carbonate or more can be pre-converted to the mono sodium salt of cyanuric acid by immersing the tablet in a minimum amount of water. The tablet is left in the water until it has completely absorbed water, and the reaction is completed as evidenced by no further evolution of carbon dioxide, a reaction product. The tablet is removed from the water and allowed to air dry. Depending on the initial ratio of sodium carbonate to cyanuric acid, the tablet will all be the mono sodium salt or a mixture of the salt and hydrated sodium carbonate. This method provides a convenient way of preparing tablets of the mono sodium salt of cyanuric acid (sodium mono isocyanurate).

One pound tablets of sodium carbonate were prepared in the following manner:

One pound of anhydrous sodium carbonate 10 was placed in a 3-inch I.D. cylinder. About 77 milliliters of water 40 (the amount of water to form the mono hydrate of sodium carbonate) was poured on top of the carbonate. A piston was placed in a cylinder 42 on top of the carbonate and pressure was applied to the piston to compress the sodium carbonate to near a maximum amount. The pressure was approximately 3,000 psi. This compression caused the carbonate to become very dense and for the water to be distributed throughout the carbonate. Hydration of the carbonate was evidenced by the evolution of heat. The tablet was ejected. It was about 3 inches in diameter and 2 inches long. It was dense and hard.

Tablets (containing 1 lb. of sodium carbonate) were made by the above compression method. It was found that it took approximately 1¾ hours for the tablet to dissolve in the skimmer water of a pool. There was no evidence of the formation of a calcium carbonate cloud in the pool water.

Tablets were made by the dry compression of a mixture of anhydrous sodium carbonate 10 and cyanuric acid 30. One pound of the mixture was used for a tablet 3 inches in diameter and about 2.5 inches long. The compression is preferably about 12,000 to 15,000 psi. The higher the percentage of cyanuric acid in the mixture, the firmer the tablets. However, the tablets were not nearly as dense or hard as only sodium carbonate tablets made by the wet method.

Skimmer tests were made with tablets containing 15% and 20% cyanuric acid. The times to dissolve were 2 and 2.5 hrs. respectively. No calcium cloud formation occurred in either case.

From my work on this invention, I conclude:

1. Tablets 12, 12' of compressed sodium carbonate or a compressed mixture of sodium carbonate and cyanuric acid can be conveniently used to add sodium carbonate or sodium carbonate and cyanuric acid as mono sodium isocyanurate to pool water 22 at a skimmer 14. This prevents the problem of the formation of a calcium carbonate cloud and rapidly dissolves the cyanuric acid as the salt to prevent any corrosion or staining.
2. The tablets 12, 12' provide a fast way for a service person to add a measured amount of sodium carbonate 10 or cyanuric acid 30.
3. Tablets of mono sodium isocyanurate can be made by wetting a compressed tablet of a stoichemetric mixture of sodium carbonate and cyanuric acid until the two chemicals react completely.
4. Tablets 12 made by compressing wet sodium carbonate form a dense hard mono hydrate which is slower in dissolving and much harder and denser than tablets made by compressing dry anhydrous sodium carbonate.
5. Considering tablets 12' which are made from a compressed mixture of sodium carbonate 10 and cyanuric acid 30, the higher the percentage of cyanuric acid 30 up to a limit of 59% the slower the rate of solution.
6. Large tablets dissolve more slowly than small tablets. The time of solution is a function of the ratio of the surface area of the tablet to the weight of material in the tablet.

Figure 6:
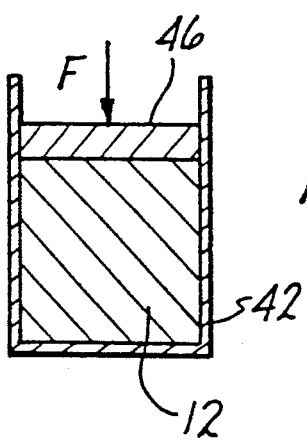
FIG. 6 is a schematical view of the forming of a tablet in a cylinder.
Figure 5:
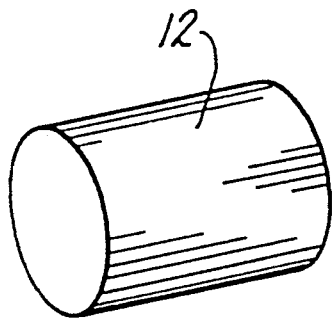
FIG. 5 is a perspective view of a cylindrical tablet.

FIG. 6 shows force F applying pressure to a piston 46 to compact material in cylinder 42 into a tablet 12. FIG. 5 shows a tablet 12 in its preferable cylindrical form.

EXAMPLE I

Tablet 41% sodium carbonate and 59% cyanuric acid by weight. Compacted in cylinder under pressure of 12,000-15,000 psi. Tablet weight 110-130 grams. Length 2½ inches. Diameter 1½ inches to 1⅝ inches. Dissolved in leaf skimmer in 480 minutes in 85° F. water. No cloudiness observed in pool water.

EXAMPLE II

Same as above except 50% sodium carbonate and 50% cyanuric acid. Dissolved in leaf skimmer in 360 minutes.

EXAMPLE III

Same as above except 60% sodium carbonate and 40% cyanuric acid. Dissolved in leaf skimmer in 280 minutes.

EXAMPLE IV

Same as above except 80% sodium carbonate and 20% cyanuric acid. Dissolved in leaf skimmer in 100 minutes.

EXAMPLE V

Same as above except 100% sodium carbonate. One part by weight of water added to six parts by weight of sodium carbonate. Mixture compressed at 3,000 psi. Dissolved in 30 minutes. No cloudiness observed in pool water.

Tablets of 100% soda ash also have been compacted at 2,000 psi. Tablets of 100% soda ash also have been formed of 1 pound weight.

Cylindrical tablets are the most practical shape. Preferably the lengths of the tablets are equal to or greater than the diameter. A length of 2½ inches is a good size. If the length of the tablet is at least equal to the diameter of the tablet, the time to dissolve generally varies according to the square of its diameter. Tablets of the same diameter but of lengths greater than the diameter all tend to dissolve in about the same time.

EXAMPLE VI

Two tablets were formed, both of 59% cyanuric acid. One was 1⅜ inches in diameter and took 8 hours to dissolve in a leaf skimmer in 85° F. water and the other was 3 inches in diameter and took 28 hours to dissolve under the same conditions.

With a mixture of cyanuric acid and soda ash, the cyanuric acid acts as a binder when a tablet is formed under suitable pressures. Sufficiently hard tablets can be formed in a mold at 10,000–15,000 psi. With 100% soda ash (and a suitable amount of water, i.e., 1 to 6 ratio), sufficiently hard tablets can be formed in a mold at 2,000–3,000 psi.

In chlorinating a pool with chlorine gas, since chlorine gas produces acid and adds no cyanuric acid, it is necessary to add 59% cyanuric acid tablets for startup. In later pool water treatments, a tablet is used of a cyanuric percentage to maintain the level of cyanuric acid desired in the pool water and with an alkalinity to stay within the desired pH range in the pool water. Because chlorine gas produces so much acid, with some neutral makeup waters it may be desireable to use the 100% soda ash tablets in addition to tablets mixing sodium carbonate and cyanuric acid.

The tablet to use (the percentage soda ash) depends on what type of chlorinating agent is used and amount, the alkalinity of the makeup water for the pool, and the amount of dilution of the pool water by rain. The pool service person or pool owner will have to make tests periodically of the pool water for pH and cyanuric acid concentration by standard available test methods to determine which tablet or tablets to use. This would involve trial and error until the proper tablet for a particular pool installation is determined. The service organization over a period of time may be able to develop standards in these regards. Objectives of proper treatment include to maintain the pH between 7.2 and 8.0 and the cyanuric acid level at about 100 ppm.

There are five commonly used chlorinating agents: 1. Elemental chlorine (gas), 2. sodium hypochlorite (liquid), 3. calcium hypochlorite, 4. sodium dichloroisocyanurate, and 5. trichloroisocyanurate.

The first produces hydrochloric acid and about one pound of soda ash per pound of chlorine used is needed for water of average alkalinity or less is needed for high alkalinity makeup water. The second and third produce alkalinity, so tablets with no excess alkalinity would be used (59% cyanuric acid). The fourth is neutral and also adds cyanuric acid so the use of this agent would maintain the level of cyanuric acid and no alkalizer would be required. Tablets of 59% cyanuric acid would be used at first startup to establish the desired level of cyanuric acid concentration. The fifth is acid and adds cyanuric acid to maintain the cyanuric acid level. At startup, tablets of 59% cyanuric acid would be used to obtain the desired concentration. In most situations the alkalinity of the makeup water would be sufficient to neutralize its acid. Of course there are various factors to consider in choosing a chlorinating agent such as cost, difficulty of application, whether a home owner or a service organization is conducting the pool maintenance, etc.

Figure 4:
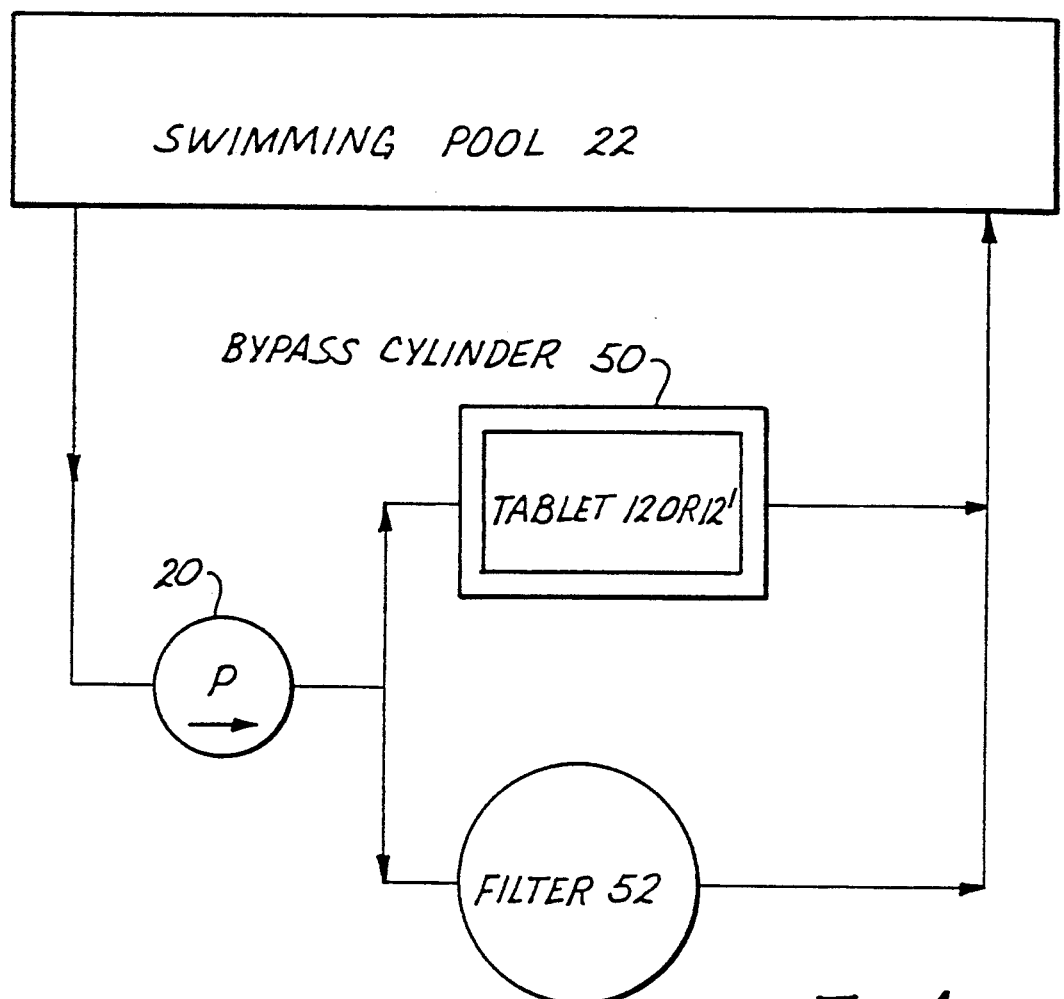
FIG. 4 is a flow diagram illustrating a tablet in a bypass cylinder in a swimming pool installation not having a leaf skimmer.

FIG. 4 illustrates putting tablets 12 or 12' in a bypass cylinder 50 instead of putting the tablets in a leaf skimmer, particularly for pools not including leaf skimmers.

The expression "bypass" means that a part of the pool water drawn by pump 20 and passed through a filter 52 instead is bypassed relative to filter 52 and instead passes through cylinder 50 so that tablets 12 or 12' are exposed to a sufficient amount of pool water to dissolve the same in a suitable length of time. Those skilled in the art will understand how to build and install a bypass cylinder 50 to receive a properly sized tablet 12 or 12' and how to size cylinder 50, how to proportion flow of water to cylinder 50 and filter 52, etc.

Having thus described my invention, I do not wish to be understood as limiting myself to the exact construction shown and described. Instead, I wish to cover those modifications of my invention that will occur to those skilled in the art upon learning of my invention and which are within the proper scope thereof.

I claim:

1. A method of treating swimming pool water, containing calcium ions, comprising:
    adding a quantity of sodium carbonate that will precipitate calcium carbonate if directly added to said pool water in excess of the solubility of sodium carbonate in said pool water to a quantity of cyanuric acid and mixing said quantity of sodium carbonate with said quantity of cyanuric acid, in an amount at least sufficient to react the sodium carbonate with all of said cyanuric acid to form mono sodium isocyanurate, before putting them in contact with the pool water and forming the mixture under pressure into tablets consisting essentially of said sodium carbonate and said cyanuric acid and providing a receptacle and a pump therefor so that water from said pool flows into said receptacle and said pump returns water from said receptacle to said pool and placing said tablets in said receptacle so that said tablets absorb water and said sodium carbonate and said cyanuric acid chemically react to form mono sodium isocyanurate, and permitting said tablets to dissolve into water passing through said receptacle.

2. The method of claim 1 in which said receptacle is provided in the form of a bypass cartridge which is connected to said pump in parallel to a pool filter.

3. A method of treating swimming pool water, containing calcium ions, comprising:
    adding a quantity of sodium carbonate that will precipitate calcium carbonate if directly added to said pool water in excess of the solubility of sodium carbonate in said pool water to a quantity of cyanuric acid and mixing said quantity of sodium carbonate with said quantity of cyanuric acid before putting them in contact with the pool water and forming the mixture under pressure into tablets consisting essentially of said sodium carbonate and said cyanuric acid and providing a receptacle and a pump therefor so that water from said pool flows into said receptacle and said pump returns water from said receptacle to said pool and placing said tablets in said receptacle so that said tablets absorb water and said sodium carbonate and said cyanuric acid chemically react to form mono sodium isocyanurate, and permitting said tablets to dissolve into water passing through said receptacle.

4. A method of treating swimming pool water, containing calcium ions, comprising:
    adding a quantity of sodium carbonate that will precipitate calcium carbonate if directly added to said pool water in excess of the solubility of sodium carbonate in said pool water to a quantity of cyanuric acid and mixing said quantity of sodium carbonate with said quantity of cyanuric acid, in an amount at least sufficient to react the sodium carbonate with all of said cyanuric acid to form mono sodium isocyanurate, before putting them in contact with the pool water and forming the mixture under pressure into tablets consisting essentially of said sodium carbonate and said cyanuric acid and placing said tablets in contact with water so that said sodium carbonate and said cyanuric acid chemically react to form mono sodium isocyanurate, and placing said tablets in contact with said pool water and permitting said tablets to gradually dissolve into said pool water.

5. The method of claim 4 in which said mixture is 41% sodium carbonate and 59% cyanuric acid by weight.

6. The method of claim 4 in which said mixture is at least 40% sodium carbonate by weight.

7. The method of claim 4 in which said mixture is at least 80% sodium carbonate by weight.

8. The method of claim 4 in which said mixture is at least 85% sodium carbonate by weight.

9. The method of claim 4 wherein there is a step in which water is added to the tablets during manufacture to convert said sodium carbonate and said cyanuric acid to mono sodium isocyanurate before said tablets are put into contact with said pool water.

10. A method of treating swimming pool water, containing calcium ions, comprising:
preprocessing a quantity of sodium carbonate by confining said quantity of sodium carbonate and adding a quantity of water sufficient to convert said quantity of sodium carbonate to the mono hydrate of sodium carbonate and applying pressure to said quantity of said sodium carbonate and the added water and creating an exothermic reaction and forming a dense hard tablet consisting essentially of mono hydrate of sodium carbonate, providing a receptacle and a pump therefore so that pool water flows into said receptacle and said pump returns water from said receptacle to said pool, and depositing said tablet into said receptacle to gradually dissolve into pool water passing through said receptacle.

11. The method of claim 10 in which said receptacle is provided in the form of a leaf skimmer.

12. The method of claim 10 in which said receptacle is provided in the form of a bypass cartridge which is connected to said pump in parallel to a pool filter.

13. A method of treating swimming pool water, containing calcium ions, comprising:
preprocessing a quantity of sodium carbonate by confining said quantity of sodium carbonate and adding a quantity of water sufficient to convert said quantity of sodium carbonate to the mono hydrate of sodium carbonate and applying pressure to said quantity of said sodium carbonate and the added water and creating an exothermic reaction and forming a dense hard tablet consisting essentially of mono hydrate of sodium carbonate, and depositing said tablet in contact with said pool water to gradually dissolve into said pool water.

* * * * *